United States Patent [19]

Brem

[11] Patent Number: 5,777,408
[45] Date of Patent: Jul. 7, 1998

[54] EXCITER CURRENT LINE IN THE ROTOR OF AN ELECTRIC MACHINE

[75] Inventor: Ernst Brem, Schlieren, Switzerland

[73] Assignee: Asea Brown Boveri AG, Baden, Switzerland

[21] Appl. No.: 314,904

[22] Filed: Sep. 29, 1994

[30] Foreign Application Priority Data

Sep. 29, 1993 [DE] Germany .................. 43 33 094.0

[51] Int. Cl.[6] .................. H02K 9/00; H02K 13/00
[52] U.S. Cl. .................. 310/71; 310/61; 310/68 R; 310/67 R
[58] Field of Search .................. 310/71, 61, 165, 310/68 R, 67 R

[56] References Cited

U.S. PATENT DOCUMENTS

| | | | |
|---|---|---|---|
| 3,363,122 | 1/1968 | Hoover et al. | 310/71 |
| 4,014,599 | 3/1977 | Bogdanov et al. | 339/5 R |
| 4,091,299 | 5/1978 | Vitchenko et al. | 310/71 |
| 4,155,019 | 5/1979 | Weghaupt | 310/61 |
| 4,210,834 | 7/1980 | Weghaupt et al. | 310/71 |
| 4,471,249 | 9/1984 | Okamoto et al. | 310/61 |
| 4,740,724 | 4/1988 | Sato et al. | 310/71 |
| 5,015,895 | 5/1991 | Obley | 310/71 |

FOREIGN PATENT DOCUMENTS

2506485  2/1975  Germany.

*Primary Examiner*—Thomas M. Dougherty
*Assistant Examiner*—B. Mullins
*Attorney, Agent, or Firm*—Oblon, Spivak, McClelland, Maier & Neustadt, P.C.

[57] ABSTRACT

An arrangement for providing exciter current in the rotor of an electric machine. The rotor winding is connected to the slip rings by exciter current conductors which are arranged in pairs in a central shaft bore of the rotor. The slip rings are arranged on a shaft stub which is connected to the rotor shaft with a releasable coupling. The central shaft bore includes bolt-side connection elements into which radially extending current supply bolts are releasably attached. The exciter current conductors are metallic pipes with an orbicular cross-section which are connected permanently at the other end to solid coupling-side connection elements. The ends of the connection elements penetrate a sealing plate in the coupling and are electrically insulated therefrom. Sealing rings are used to seal the sealing plate with respect to the rotor shaft and the ends of the coupling side connection elements which penetrate the sealing plate.

12 Claims, 9 Drawing Sheets

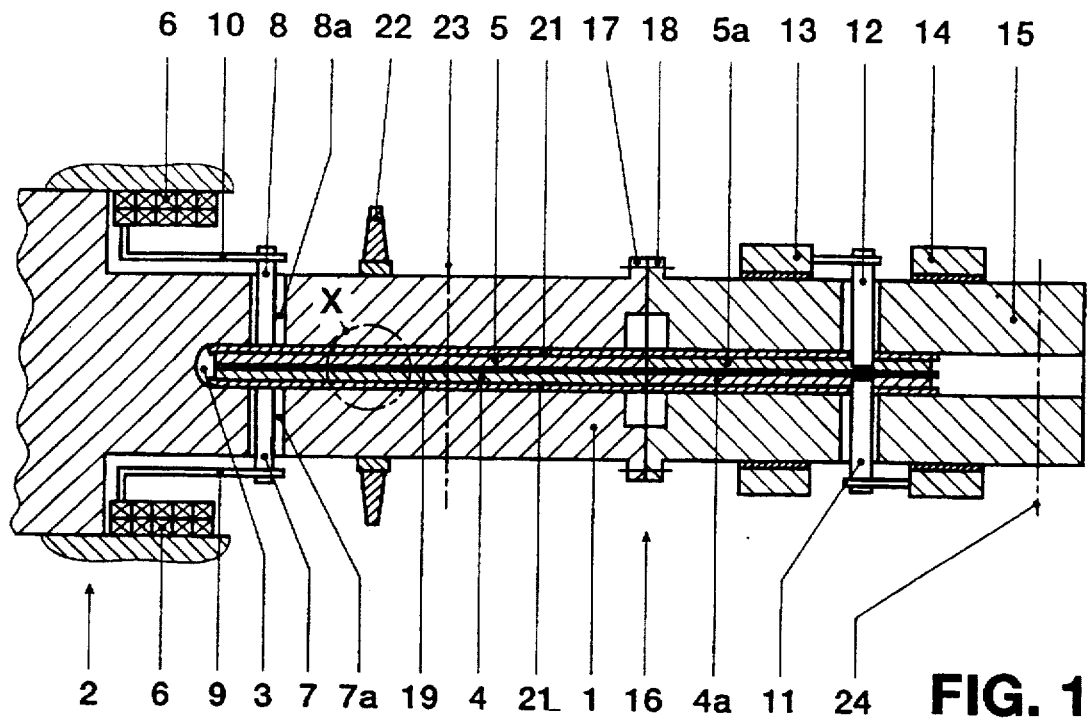
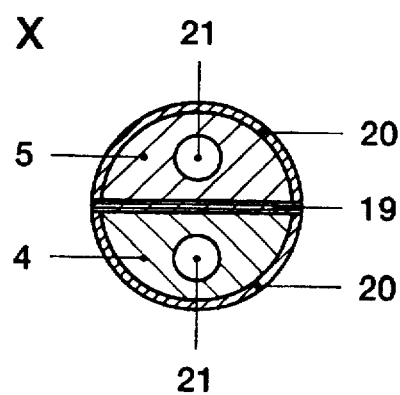
FIG. 1
FIG. 1a

EXCITER CURRENT LINE IN THE ROTOR OF AN ELECTRIC MACHINE

BACKGROUND OF THE INVENTION

1. Field of the Invention

The invention relates to an exciter current line in the central shaft bore in the rotor of an electric machine, in particular turbo generator, for connecting the exciter conductors which are arranged centrally in pairs extending axially in the rotor and provided with a cooling channel in the longitudinal direction of the conductors to, on the one hand, the current supply bolts arranged radially in the rotor shaft and, on the other hand, an exciter current source which is arranged on a shaft stub which is attached to the non-drive-side shaft end of the rotor by means of a releasable coupling.

In this context the invention relates to a prior art such as is found for example in U.S. Pat. No. 3,457,440.

2. Discussion of Background

In turbo generators, the exciter lines on the rotor are generally guided to the rotor winding in a central shaft bore. The conductors in the shaft bore are usually solid with a semi-circular cross-section and are insulated all around and with respect to one another. The connection of these centrally guided solid conductors to the rotor winding is usually made by current supply bolts screwed radially into the solid conductors. The said current supply bolts are in turn connected to the exciter winding of the rotor.

The exciter line is constructed as a pair and runs under the non-drive-side bearing to the exciter current source. The latter can be a slipring arrangement. However, the current source can also be a rotating rectifier arrangement as in the case of U.S. Pat. No. 3,457,440 quoted at the beginning, which rectifier arrangement is fed from a rotating transformer. Both types of exciter current sources are designated below in short as exciter arrangement. In the case of large electrical machines, the exciter arrangement is usually connected to the main machine by means of a releasable coupling.

Exciter currents which can be several hundred amps flow in the exciter conductors. Moreover, in large turbo generators the exciter conductors are of a considerable length, usually of several meters. For this reason, large exciter conductor cross-sections are necessary. Hitherto, it has been considered best to design the cross-section such that both conductors complement each other to form a conductor arrangement with a circular cross-section. In machines with a fluid-cooled exciter winding, the cooling medium (gas or a liquid) is fed through cooling channels in the exciter line and conducted away again through separate channels next to the central shaft bore. In gas-cooled machines, the cooling gas is supplied through a radial shaft bore which is connected to the discharge space of the fan of the machine. The cooling gas flows through the cooling channels in the exciter conductors and leaves the rotor again at the current supply bolt.

In air-cooled machines, this technology does not present any problems. At most, possible leakages influence the cooling effect. In contrast, the conditions in machines with hydrogen cooling are completely different, the critical area being the coupling of main machine and exciter machine: electrical insulation, support of the exciter conductors, possibility of dismantling and gas-tightness can only be realized by involved measures given the complex geometry of the exciter conductors. In addition, exciter lines of this kind are extremely expensive because they are not standard profiles.

SUMMARY OF THE INVENTION

Accordingly, starting from the prior art, one object of the invention is to provide a novel exciter line, of the generic type mentioned at the beginning, which satisfies all operating requirements with respect to electrical insulation, support of the exciter conductors, possibility of dismantling and gas-tightness.

According to the invention, this object is achieved in that the coupling-side ends of the exciter current conductors are permanently connected to coupling-side connection elements, in that the said connection elements have an essentially circular cross-section and with their ends penetrate axially extending through-bores in a sealing plate and are electrically insulated therefrom, the sealing plate being screwed in the region of the coupling to the end of the shaft, and in that means for gas-tight sealing of the sealing plate with respect to the rotor shaft and with respect to the ends, which penetrate the sealing plate, of the coupling-side connection elements are provided.

A preferred embodiment of the invention provides for bolt-side connection elements to be provided in the central shaft bore, into which connection elements the said current supply bolts are releasably attached, in that the exciter current conductors are realized as metallic pipes with an orbicular cross-section and are permanently connected to the bolt-side connection elements, in that these pipes are permanently connected at the other end to solid coupling-side connection elements which penetrate a sealing plate with their ends.

The invention is based on the idea of making the sealing faces of geometrically simple design, preferably therefore of providing planar or orbicular sealing faces, wherever it is technically necessary and appropriate. Because not only measures for sealing but also electrical insulations have to be provided, by synergy a simplification of the insulation results because planar and orbicular objects are simpler to insulate than those with a complex geometry. A further advantage of the invention is that the production of the respective components is also simpler and economical and to a certain extent standard parts can be used.

Exemplary embodiments of the invention and the advantages which can be achieved therewith are explained in greater detail below with reference to the drawing.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 shows a simplified longitudinal section through the non-drive-side end of a turbo generator;

FIG. 1a shows an enlarged cross-section through the exciter conductors of the turbo generator according to FIG. 1;

DESCRIPTION OF THE PREFERRED EMBODIMENTS

Figure 2A:
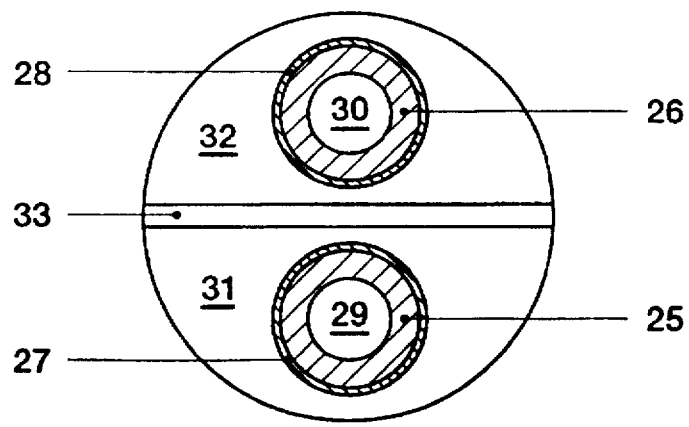
FIG. 2a shows an enlarged cross-section through the shaft bore according to FIG. 2 along its line AA.

Referring now to the drawings, wherein like reference numerals designate identical or corresponding parts throughout the several views. Before the invention is described in detail, the customary design of a turbo generator will first be described with reference to FIG. 1 which shows a simplified longitudinal section through the non-drive-side end of a gas-cooled turbo generator.

The shaft 1 of the rotor 2 is provided with a central bore 3. In this bore 3, the exciter current conductors 4, 5 are located in pairs. The said exciter current conductors 4, 5 connect the rotor winding 6 to the two sliprings 13, 14 on the non-drive-side shaft end via radially arranged first supply bolts 7, 8 which extend in radial shaft bores 7a and 8a and connection conductors 9, 10 via second supply bolts 11, 12 which are also arranged in radial shaft bores 11a and 12a. The sliprings 13, 14 and the second supply bolts are arranged on a shaft stub 15 which is connected to the rotor shaft 1 by means of a releasable coupling 16 (with coupling halves 17, 18). In the region of this coupling 16, the exciter current conductors 4, 5 are usually divided and an electric coupling (not shown) is provided. The exciter current conductors leading from the coupling 16 to the second supply bolts are designated by 4a and 5a.

In known machines, the exciter current conductors 4, 5, 4a and 5a have a semi-circular cross-section and are electrically insulated with respect to one another and with respect to the shaft 1 or the shaft stub 15. This insulation is designated in FIG. 1 and the detailed image by 19 and 20 and the cooling channel which extends in the longitudinal direction of the conductors in the exciter current conductors is designated by 21.

For the sake of completeness, the axial fan 22 is shown in FIG. 1. The bearing point of the rotor is symbolized by the dot-dashed line 23, and that of the shaft stub by the dot-dashed line 24. In addition, in hydrogen-cooled machines a shaft seal (not shown in FIG. 1) for gas-tight separation of the hydrogen-filled interior of the machine, which is under excess pressure, from the external environment is located in the shaft section between the fan 22 and the coupling 16.

As already stated at the beginning, the exciter current conductors 4, 5 in relatively large and large machines are cooled. For this purpose, the exciter current conductors have a cooling channel 21 which extends in the longitudinal direction of the conductors (cf. detailed image X of FIG. 1). The supply and/or discharge of the cooling gas flowing through the bore can take place here in a wide variety of ways (cf. U.S. Pat. No. 2,286,871 or U.S. Pat. No. 3,393,333). The problems which occur here in conjunction with the gas-tight sealing of the exciter current conductors are, however, the same everywhere.

Here, the invention comes into play. It is based on the idea of making the sealing faces of geometrically simple design, therefore of preferably providing planar or orbicular sealing faces, and at the same time as far as possible using standard profiles for the actual exciter current lines, wherever it is technically necessary and appropriate. An exemplary embodiment realized according to these considerations is illustrated for example in FIGS. 2 to 5, as far as possible identical components to those in FIG. 1 having been provided with the same reference symbols.

The actual exciter current lines which are usually several meters long in the central shaft bore 9 consist of copper pipes 25 and 26 which are each surrounded by a thin insulating pipe 27 and 28. The inside of the copper pipes 25, 26 forms the cooling channels 29 and 30. The bolt-side end of the copper pipes 25, 26 open into bolt-side connection elements 31 and 32 made of steel with a generally semi-circular cross-section and are hard soldered thereto. An insulating plate 33 serves to provide electrical insulation for the two connection elements which are at different potential. An insulating pipe 34 insulates both connection elements with respect to the shaft 1. The connection elements 31 and 32 are provided with radially extending threaded bores into which the ends which are provided with thread, of the supply bolts 7 and 8 are screwed. Insulating pipes 34 and 35 in the radial shaft bores through which the supply bolts 7 and 8 lead to the outside serve the same purpose. The connection elements are also provided with bores 31a and 32a which produce a free connection between the cooling channels 29, 30 and the annular space between the shaft of the supply bolts 7, 8 and the said insulating pipes 34 and 35.

Figure 3:
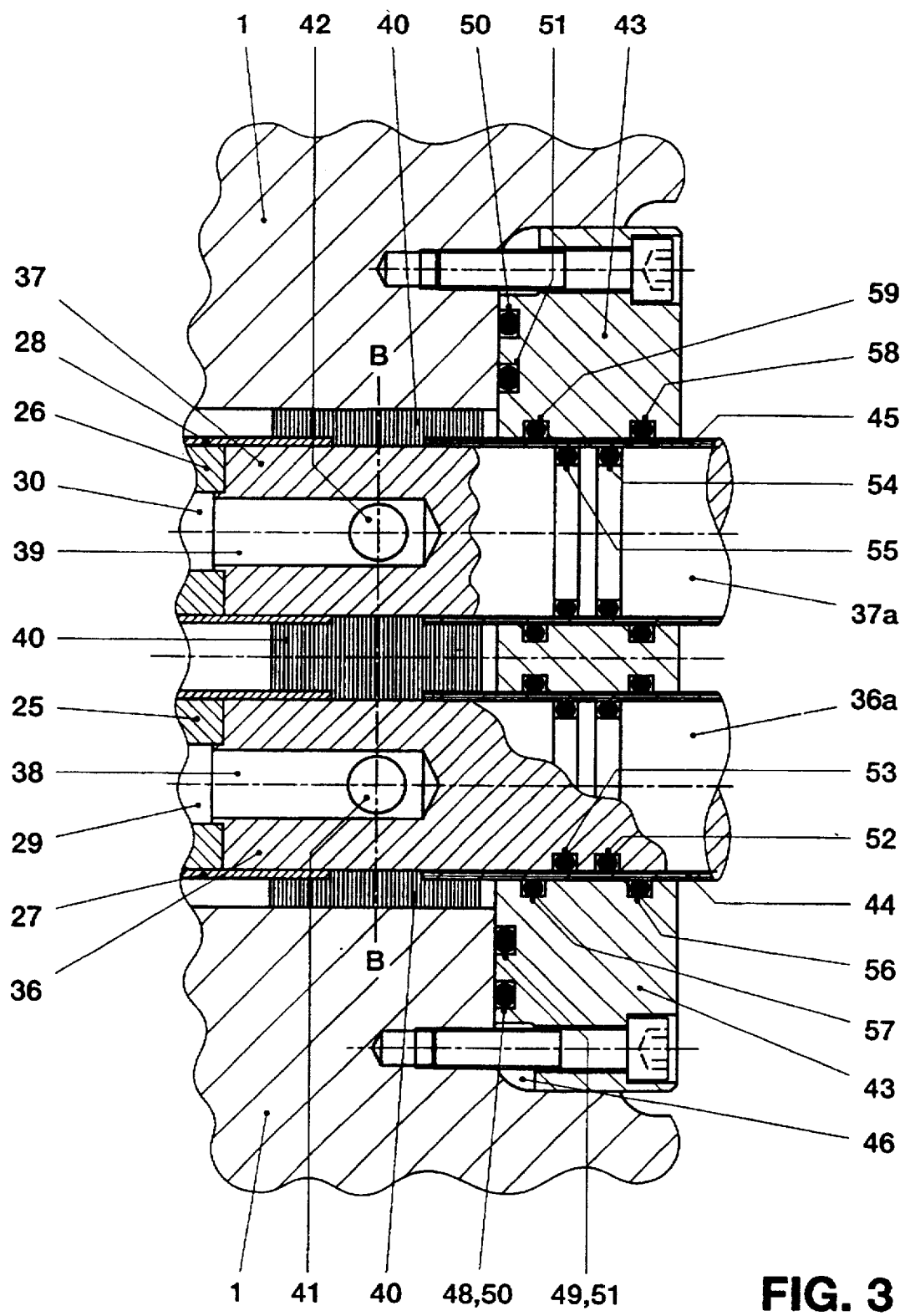
FIG. 3 shows an enlarged portion of FIG. 2.

FIG. 3 shows an enlarged longitudinal section through the coupling-side end part of the exciter current lines. Here, the copper pipes 25, 26 are hard soldered to coupling-side connection elements 36 and 37 with an orbicular cross-section. Their external diameter corresponds to the external diameter of the copper pipes 25 and 26. The connection elements 36, 37 are provided with a blind bore 38 and 39 which is open towards the copper pipes. The said blind bores 38 and 39 form the continuation of the cooling channels 29 and 30. The connection elements 36, 37 are arranged in an insulating element 40 which, apart from two lateral flattened portions, fills the shaft bore 3. Lateral through-bores 41, 42 start from the said flattened portions and also penetrate the two coupling-side connection elements 36, 37. In this way, a free connection is produced between the cooling channels 29, 30 and the space between the copper pipes 25 and 26, by means of which connection cooling gas can be directed through the said cooling channels in a way which will be described later.

Figure 3A:
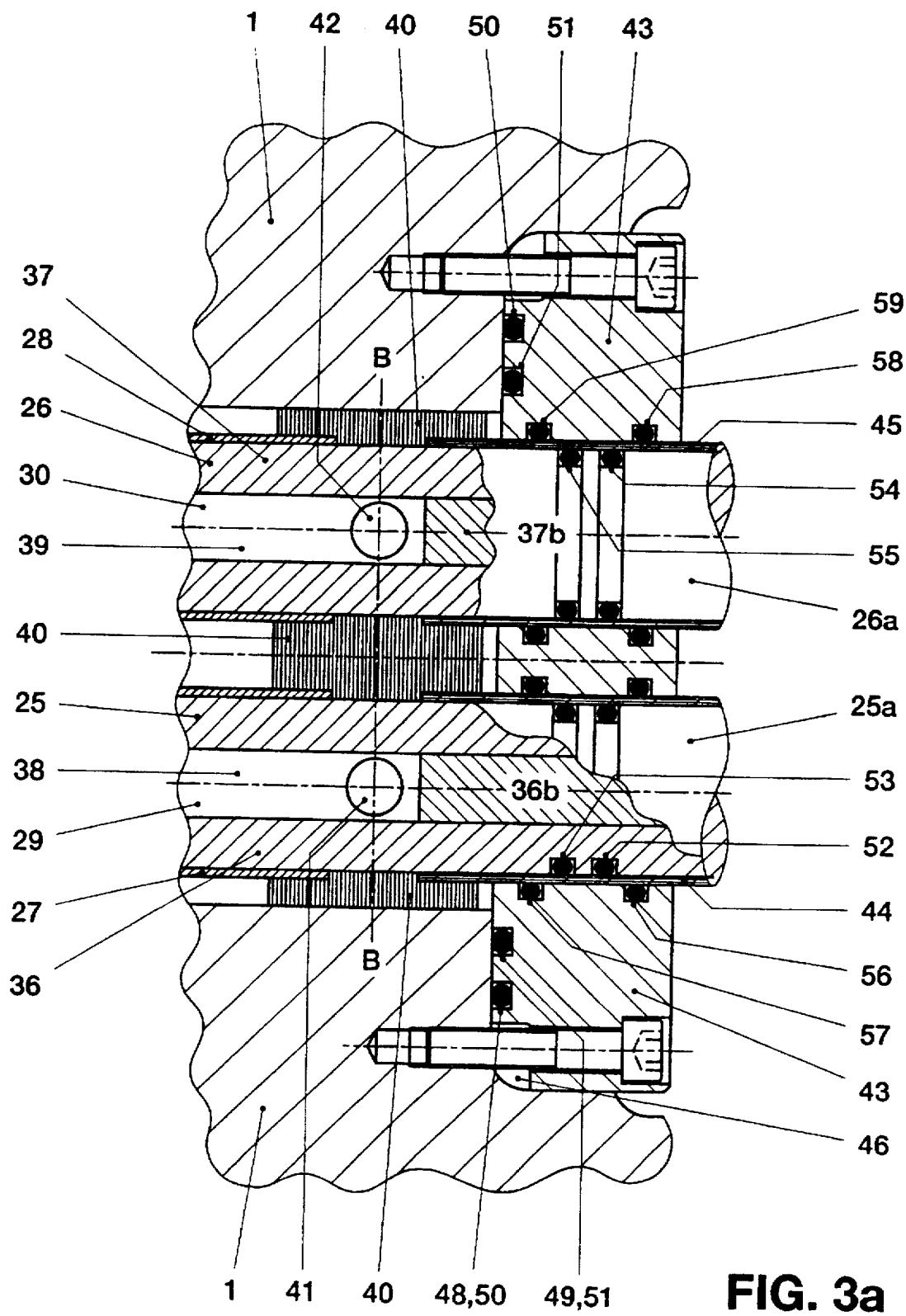
FIG. 3a shows an enlarged portion of FIG. 2 with an alternative embodiment of the coupling-side ends of the exciter current conductors.
Figure 4:
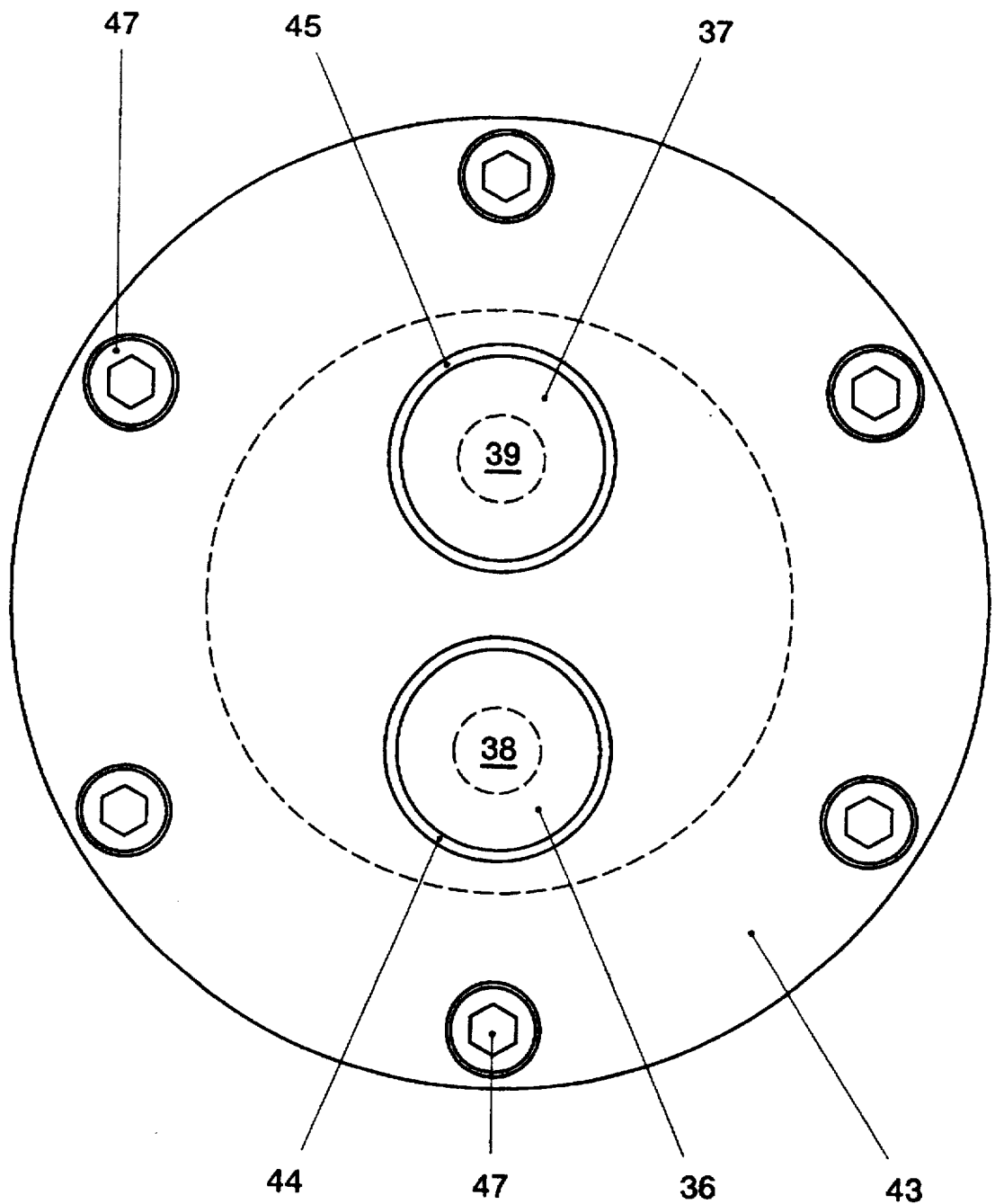
FIG. 4 shows a top view of the sealing plate.
Figure 5:
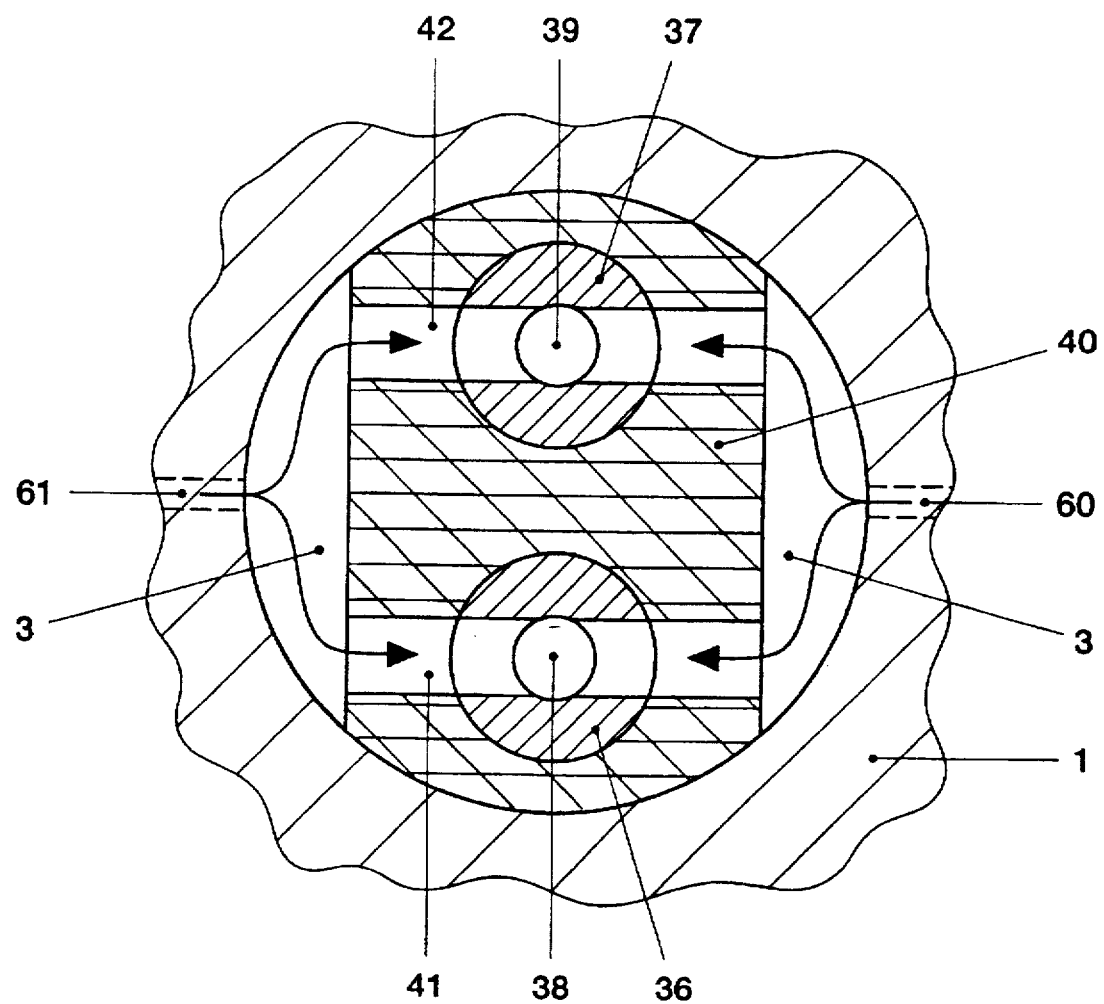
FIG. 5 shows a section through the junction part according to FIG. 3 along its line BB.

The connection elements 36, 37 which are connected to the copper pipes 25, 26 can also be realized integrally with the pipes 25, 26, as is illustrated for example in FIG. 3a. The copper pipes 25, 26 then project with their ends 25a, 26a through the sealing plate 43. Inserts 36b, 37b which are soldered into the interior of the pipe produce a gastight seal of the interior of the pipe and thus of the cooling channels 29, 30 with respect to the external environment.

The coupling-side connection elements 36, 37 and the (sealed) pipe ends 25a, 26a protrude out on the coupling-side end face of the insulating element 40. Their ends 36a, 37a and 25a, 26a penetrate a metallic, disc-shaped sealing plate 43 which they also project over axially. Insulating pipes 44, 45 which are pushed over the said ends of the connection elements 36, 37 and pipe ends 25a, 26a insulate the latter from the metallic sealing plate 43.

Figure 2:
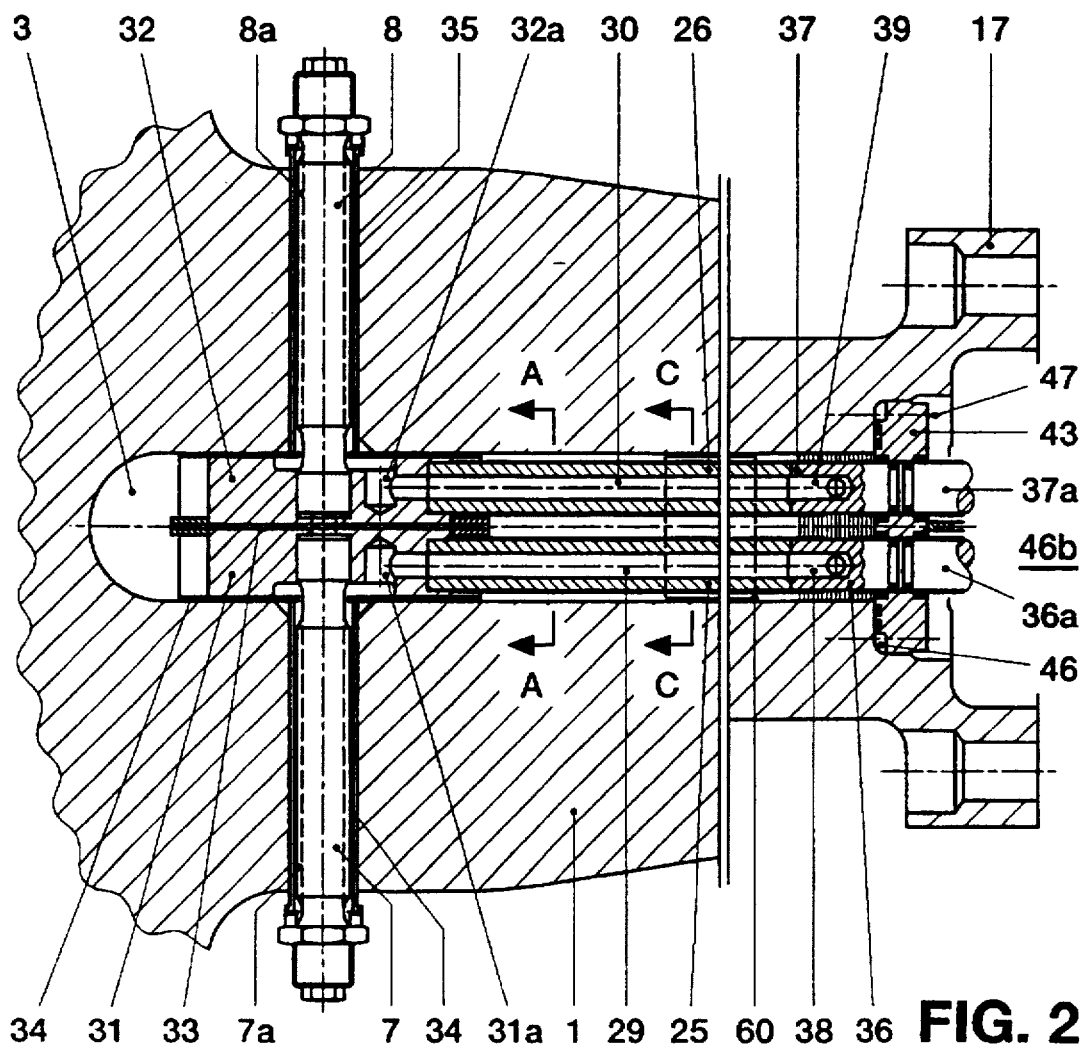
FIG. 2 shows a more detailed longitudinal section through the said end part in the region of the current supply bolt as far as the sealing plate.

As is clear from FIG. 2, the end side of the shaft 1 is provided with a stepped recess 46. The sealing plate 43 is screwed into the rear orbicular recess 46a by means of screws 47. The front recess 46b serves to receive the electrical coupling (not illustrated in greater detail) of the exciter conductors 4 and 5 and 4a and 5a.

Two concentric annular grooves 48, 49 into which sealing rings 50 and 51, so-called O-rings are inserted are provided in the bolt-side end face of the sealing plate 43 for sealing in a gas-tight fashion the sealing plate 43 with respect to the shaft. The seals of the ends 36a, 37a, protruding out of the insulating element 40, of the coupling-side connection elements 36 and 37 and the pipe ends 25a, 26a with respect to the insulating pipes 44 and 45 and also the seal of the insulating pipes 44 and 45 with respect to the sealing plate 43 is also effected by means of sealing rings 52, 53 and 54, 55 and 56, 57 and 58, 59 which are also arranged in pairs. Here, the sealing rings 52 to 55 are each located in annular grooves in the ends 36a and 37a of the connection elements 36, 37 or the pipe ends 25a, 26a; the sealing rings 56 to 59 being located in annular grooves in the inner wall of the two axial through-bores in the sealing plate 43.

All these sealing faces are either planar faces or orbicular and can thus be reliably sealed with simple means. As can be clearly seen from FIG. 3, in this way a perfect seal of the shaft bore 3 with respect to the coupling can be achieved. Moreover, the structure described permits simple removal of the exciter line: After the two coupling halves 17, 18 are separated and the screws 47 are unscrewed and the supply bolts 7, 8 removed the entire exciter line can be readily pulled out of the shaft bore.

Figure 6:
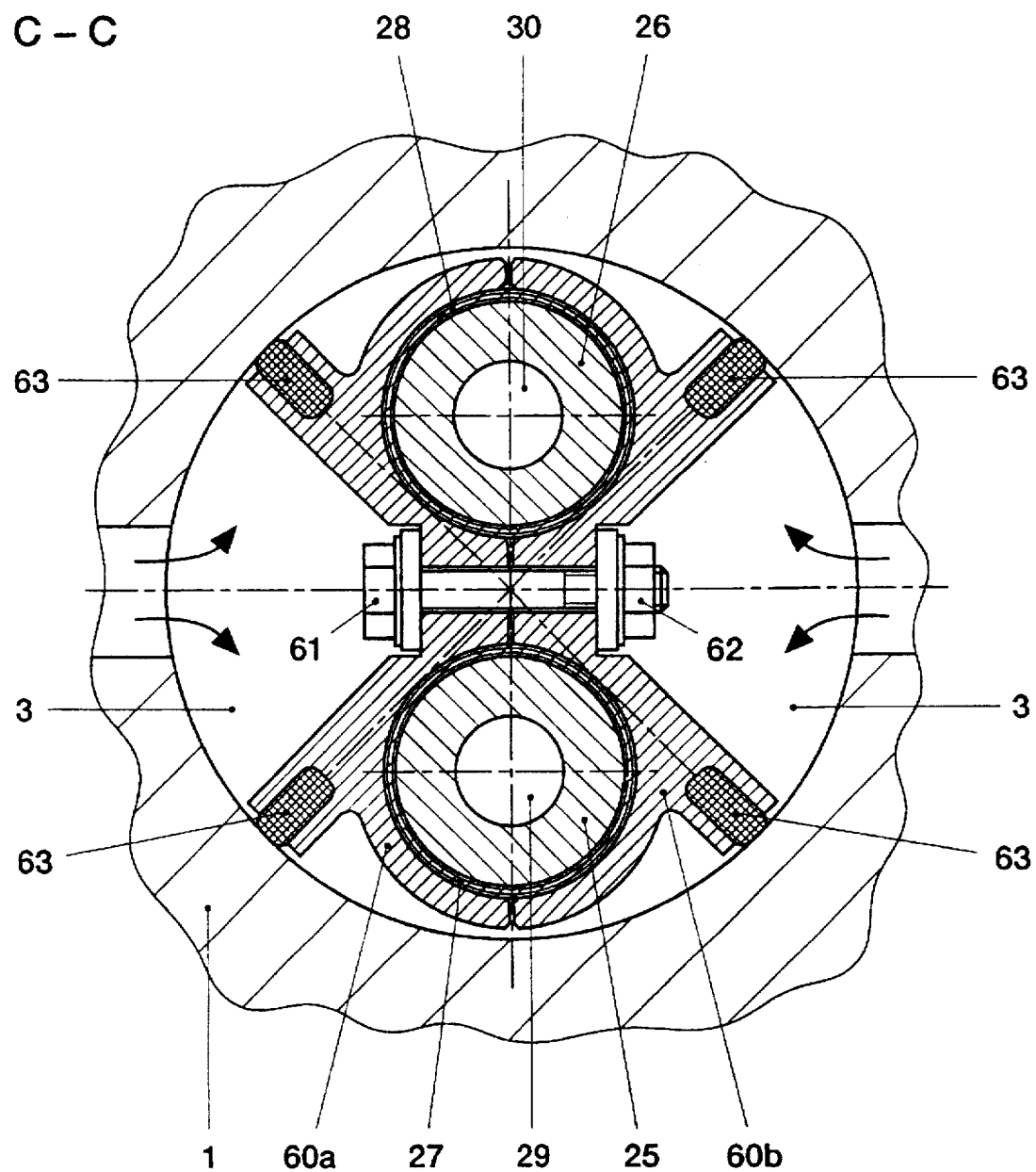
FIG. 6 shows a longitudinal section through the shaft bore in the region of the sealing plate in an embodiment variant with exciter current conductors with semi-circular cross-section.

As is clear from FIG. 2 and even better from the cross-section through the central section of the shaft bore 3 according to FIG. 6, the exciter current conductors (copper pipes 25 and 26) are supported and centered here against the effect of centrifugal force. For this purpose, a two-component X-shaped aluminum element 60, consisting of the halves 60 and 60b, is inserted into the shaft bore 3. The two halves are screwed to one another with bolt 61 and nut 62, the (insulated) copper pipes 25 and 26 being simultaneously secured. In order to avoid friction corrosion between the aluminum element 60 and the wall of the shaft bore 3, axially extending grooves are provided in the leg ends, into which grooves plastic strips 63 are inserted.

In addition, the proposed structure of the exciter line permits, also using copper pipes 25, 26 with circular cross-section, optimum cooling of these conductors which conduct high currents. Cooling gas from the discharge space behind the fan 22, more precisely from a refrigerated gas chamber under the winding head of the rotor, is conducted via channels 60, 61 (FIG. 5) into the shaft bore 9 and flows there in the space between its wall and the (insulated) copper pipes 25, 26 to the coupling-side connection elements 36 and 37. Here, it passes via the lateral bores 41, 42 into the interior of the copper pipes 25 and 26, flows through them and leaves the rotor again via the bores in the bolt-side connection elements 31 and 32 and the radial shaft bores 7a, 8a for the supply bolts 7, 8 into the hot gas chamber which is also under the winding head of the rotor. The arrangement of these refrigerated gas and hot gas chambers is described in detail in EP-A-0 547 360 and the U.S. patent application Ser. No. 07/988,192, dated Sep. 12, 1992, by the Applicant with the same contents, to which reference is herewith made expressly. Here, it is significant that a pressure difference is present so that a flow takes place.

Figure 7:
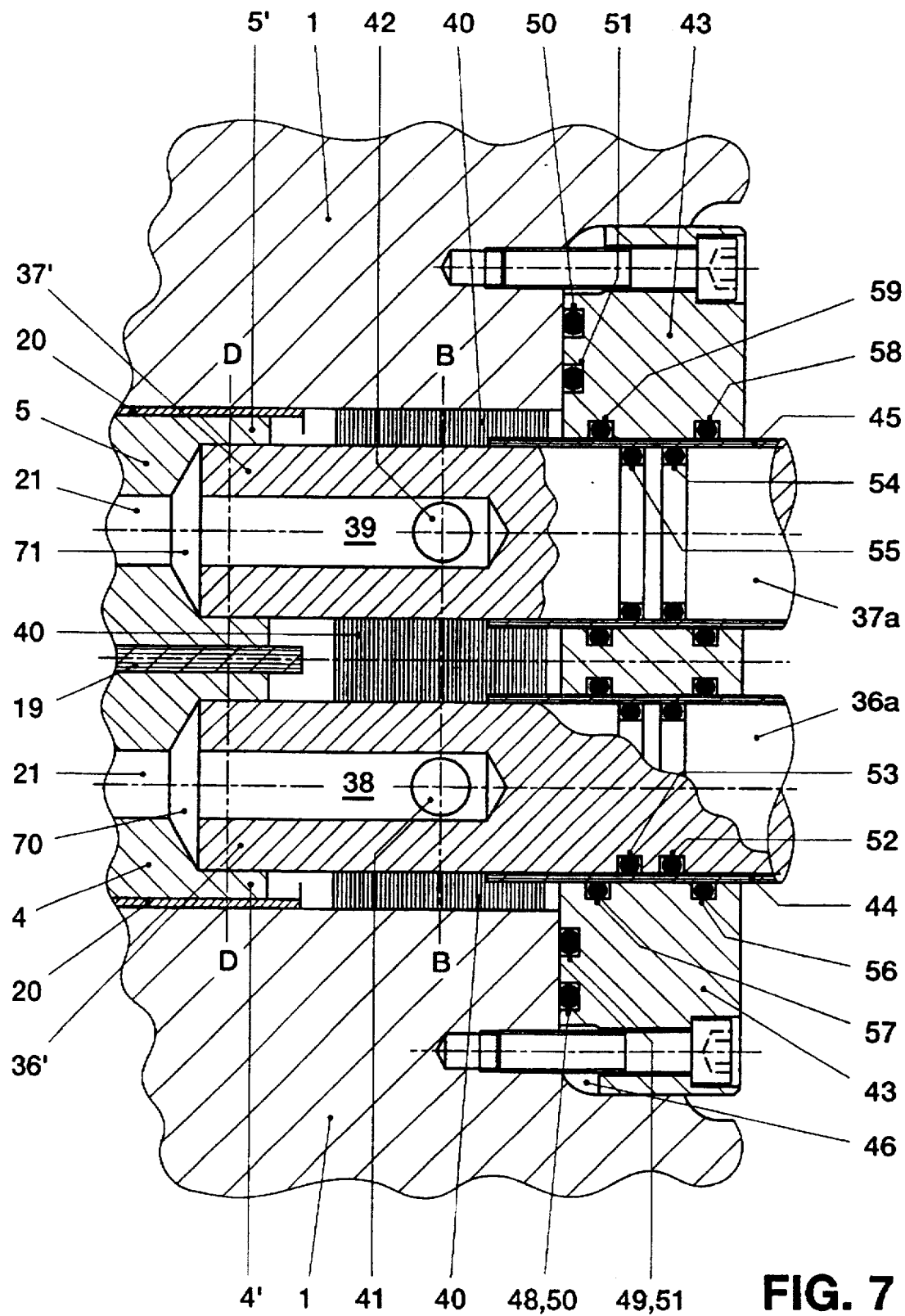
FIG. 7 shows a cross-section through the junction area between exciter current conductors and sealing plate according to FIG. 6 along its line CC.
Figure 8:
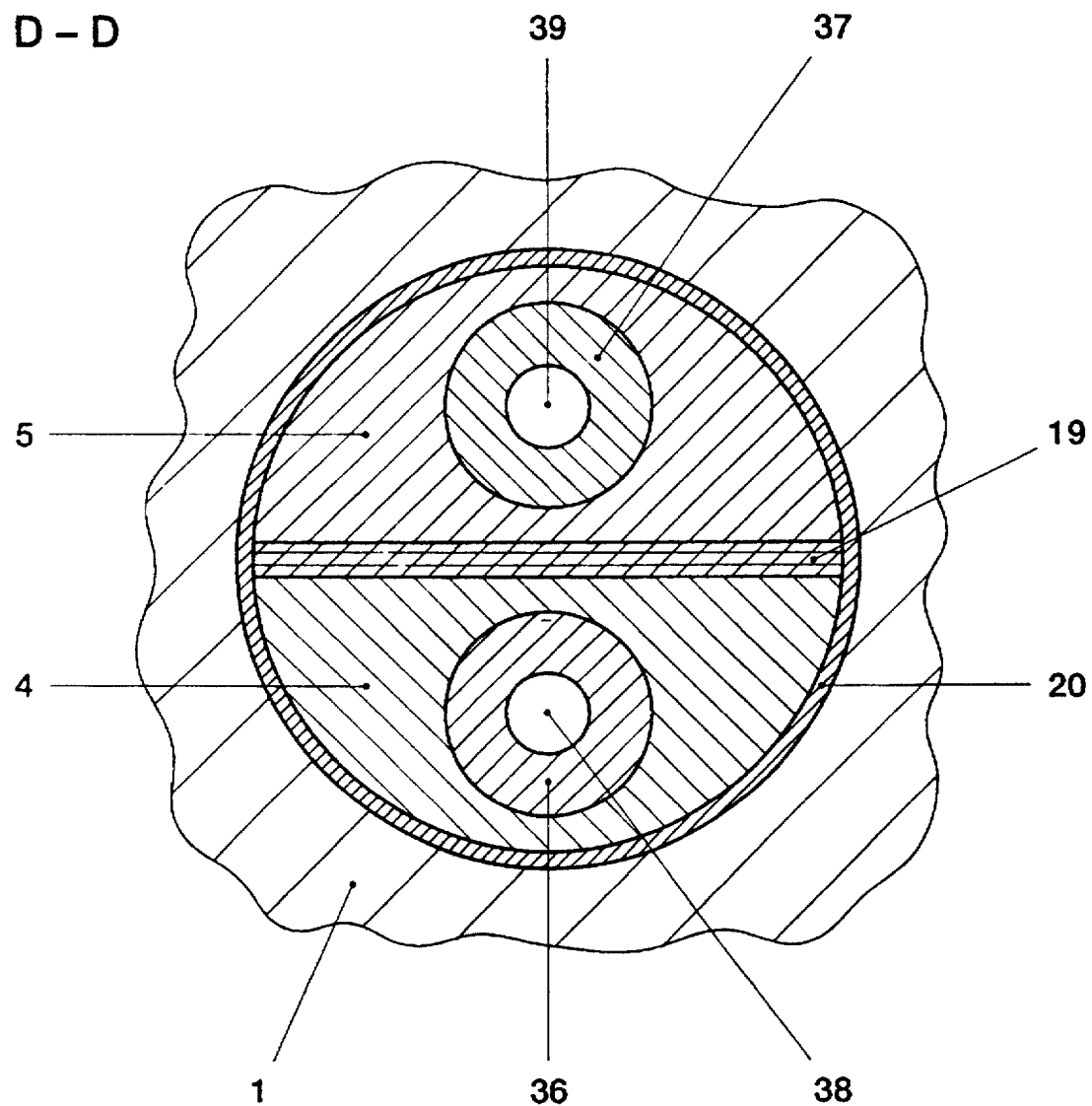

In addition to the preferred embodiment with exciter conductors which are realized as pipes with circular cross-section, the invention can also be realized with exciter conductors with semi-circular cross-section. This is illustrated for example in FIGS. 7 and 8 in which identical components or components which act in the same way are provided with the same reference symbols as in FIGS. 1 to 6.

The coupling-side ends 4' and 5' of the exciter conductors 4 and 5 are provided with bolt-shaped junction elements 36' and 37' which correspond to the connection elements 36 and 37 of the embodiment illustrated in FIGS. 2 and 3. The said junction elements are soldered or screwed into bores 70, 71 in the end sides of the ends 4', 5' of the exciter current conductors. The bores 38 and 39 in the junction elements 36' and 37' are aligned with the cooling channels 21 in the exciter current conductors 4 and 5. The seal of the junction elements 36' and 37' in the sealing plate 43 and the seal of the sealing plate 43 with respect to the shaft 1 is effected in exactly the same way as has been described in conjunction with FIGS. 2 to 5. Instead of bolt-shaped junction elements 36', 37', the ends 4' and 5' of the exciter current conductors 4 and 5 can also be provided with a pin which is constructed integrally with the exciter current conductors 4 and 5. The insulating element 40 can also be dispensed with in this variant.

Obviously, numerous modifications and variations of the present invention are possible in light of the above teachings. It is therefore to be understood that within the scope of the appended claims, the invention may be practiced otherwise than as specifically described herein.

| LIST OF DESIGNATIONS | |
|---|---|
| 1 | Rotor shaft |
| 2 | Rotor |
| 3 | Central shaft bore in 1 |
| 4, 4', 5, 5' | Exciter current conductor |
| 4a, 5a | Exciter current conductor to the sliprings |
| 6 | Rotor winding |
| 7, 8 | First supply bolts |
| 7a, 8a | Radial shaft bores in 1 |
| 9, 10 | Connecting conductor between 6 and 7 and 8 |
| 11, 12 | Second supply bolts |
| 11a, 12a | Radial shaft bores in 15 |
| 13, 14 | Sliprings |
| 15 | Shaft stub |
| 16 | Coupling |
| 17, 18 | Coupling halves of 16 |
| 19 | Insulation between 4 and 5 and 4a and 5a |
| 20 | Insulation between 4, 5 and 4a, 5a and 1 and 15 |
| 21 | Cooling channels in 4 and 5 |
| 22 | Axial fan |
| 23 | Bearing point of 1 |
| 24 | Bearing point of 15 |
| 25, 26 | Copper pipes |
| 25a, 26a | Ends of 25 and 26 |
| 27, 28 | Insulating pipes |
| 29, 30 | Cooling channels in 25 and 26 |
| 31, 32 | Bolt-side connection elements |
| 31a, 32a | Bores in 31 and 32 |
| 33 | Insulating plate |
| 34, 35 | Insulating pipes |
| 36, 37 | Coupling-side connection elements |
| 36a, 37a | Free ends of 36 and 37 |
| 36b, 37b | Inserts in 25a and 26a |
| 36', 37' | Bolt-shaped junction elements |
| 38, 39 | Blind bores in 36 and 37 |
| 40 | Insulating element |
| 41, 42 | Lateral through-bores in 36, 37 and 40 |
| 43 | Sealing plate |
| 44, 45 | Insulating pipes |
| 46 | Stepped recess on 1 |

-continued

LIST OF DESIGNATIONS

| | |
|---|---|
| 47 | Screws |
| 48, 49 | Annular grooves in 43 |
| 50–59 | O-rings |
| 60 | Two-component aluminum element |
| 60a, 60b | Halves of 60 |
| 61 | Screw |
| 62 | Nut |
| 63 | Plastic strips |
| 70, 71 | Bores in 4' and 5' |

What is claimed as new and desired to be secured by Letters Patent of the United States is:

1. An exciter current means in the central shaft bore in the rotor of an electric machine, comprising:

current supply bolts, an exciter current source and exciter current conductors, said exciter current conductors extending axially in the central shaft bore of the rotor and being provided with a cooling channel in the axial direction of the conductors for connecting said current supply bolts, arranged radially in the rotor shaft, for the rotor winding to said exciter current source, said exciter current source being arranged on a shaft stub, said shaft stub being attached to a non-drive-side shaft end of the rotor by means of a releasable coupling, wherein coupling-side ends of the exciter current conductors are permanently connected to coupling-side connection elements, wherein the said connection elements have an essentially circular cross-section and extend axially through a sealing plate and are electrically insulated therefrom, the sealing plate being screwed in the region of the coupling to the shaft end, and wherein means for gas-tight sealing of the sealing plate with respect to the rotor shaft and with respect to the ends of the coupling-side connection elements, which penetrate the sealing plate, are provided, wherein bolt-side connection elements are provided in the central shaft bore, said current supply bolts being releasably attached to said connection elements, wherein the exciter current conductors are metallic pipes with an orbicular cross-section and are permanently connected to the bolt-side connection elements, wherein these pipes are permanently connected at the coupling-side end to the coupling side connection elements and penetrate the sealing plate with their ends, wherein the bolt-side connection elements are provided with channels, and wherein the coupling-side connection elements are provided with through-bores which penetrate an insulating element so that a connection is produced from the current supply bolts via the interior of the metallic pipes into a space between the shaft bore and said metallic pipes.

2. Exciter current line as claimed in claim 1, wherein the metallic pipes are of integral construction with the coupling-side connection elements, the metallic pipes being closed off in a gas-tight fashion in the area of the sealing plate by an insert.

3. The exciter current line as claimed in claim 1, wherein the coupling-side ends of the metallic pipes and the connection elements are secured in a common insulating element which, apart from two lateral flattened portions, completely fills the shaft bore.

4. The exciter current line as claimed in claim 1, wherein the exciter current conductors have, with the exception of their coupling-side end, a semicircular cross-section, and wherein the current supply bolts for the exciter winding are screwed directly into the exciter current conductors.

5. The exciter current line as claimed in claim 1, wherein the bolt-side connection elements have a semicircular cross-section and are electrically insulated with respect to the shaft bore, both elements complementing one another, together with an insulating plate arranged between them, to form an arrangement with a circular cross-section with an external diameter which corresponds to the internal diameter of the shaft bore.

6. The exciter current line as claimed in claim 1, wherein annular grooves in which sealing rings are inserted are provided in a bolt-side end face and in axial through-bores of the sealing plate.

7. The exciter current line as claimed in claim 1, wherein insulating pipes are provided for insulating the ends of the coupling-side connection elements, and wherein said ends are provided with annular grooves in which sealing rings are inserted.

8. The exciter current line as claimed in claim 2, wherein the coupling-side ends of the metallic pipes and the connection elements are secured in a common insulating element which, apart from two lateral flattened portions, completely fills the shaft bore.

9. The exciter current line as claimed in claim 2, wherein the bolt-side connection elements have a semicircular cross-section and are electrically insulated with respect to the shaft bore, both elements complementing one another, together with an insulating plate arranged between them, to form an arrangement with a circular cross-section with an external diameter which corresponds to the internal diameter of the shaft bore.

10. The exciter current line as claimed in claim 3, wherein the bolt-side connection elements have a semicircular cross-section and are electrically insulated with respect to the shaft bore, both elements complementing one another, together with an insulating plate arranged between them, to form an arrangement with a circular cross-section with an external diameter which corresponds to the internal diameter of the shaft bore.

11. The exciter current line as claimed in claim 2, wherein annular grooves in which sealing rings are inserted are provided in a bolt-side end face and in axial through-bores of the sealing plate.

12. The exciter current line as claimed in claim 3, wherein annular grooves in which sealing rings are inserted are provided in a bolt-side end face and in axial through-bores of the sealing plate.

* * * * *